United States Patent
Nakasuji et al.

(10) Patent No.: US 11,274,672 B2
(45) Date of Patent: Mar. 15, 2022

(54) ROTATION DRIVING DEVICE, METHOD FOR MOUNTING ROTATION DRIVING DEVICE, AXIAL BLOWER, METHOD FOR MOUNTING AXIAL BLOWER, AND LASER OSCILLATOR

(71) Applicant: Mitsubishi Electric Corporation, Tokyo (JP)

(72) Inventors: Toshie Nakasuji, Tokyo (JP); Koji Funaoka, Tokyo (JP); Masahiko Hasegawa, Tokyo (JP); Yoshiharu Kurosaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 137 days.

(21) Appl. No.: 16/631,057

(22) PCT Filed: Jul. 23, 2018

(86) PCT No.: PCT/JP2018/027534
§ 371 (c)(1),
(2) Date: Jan. 14, 2020

(87) PCT Pub. No.: WO2019/026673
PCT Pub. Date: Feb. 7, 2019

(65) Prior Publication Data
US 2020/0182252 A1    Jun. 11, 2020

(30) Foreign Application Priority Data
Aug. 1, 2017  (JP) .............................. JP2017-149048

(51) Int. Cl.
*F04D 25/06* (2006.01)
*F04D 29/058* (2006.01)
(Continued)

(52) U.S. Cl.
CPC ....... *F04D 25/0606* (2013.01); *F04D 19/002* (2013.01); *F04D 19/007* (2013.01);
(Continued)

(58) Field of Classification Search
CPC ............ H02K 7/14; H02K 9/14; H02K 1/185; H02K 2205/09; H02K 5/128;
(Continued)

(56) References Cited

U.S. PATENT DOCUMENTS 3,243,102 A * 3/1966 McMahan ............. F04D 29/441
                                                    415/208.2
8,636,479 B2 * 1/2014 Kenyon ................ F04D 29/603
                                                    417/350
(Continued)

FOREIGN PATENT DOCUMENTS

JP    2000045987 A    2/2000
JP    2008306842 A    12/2008
(Continued)

OTHER PUBLICATIONS

International Search Report (PCT/ISA/210) dated Sep. 18, 2018, by the Japan Patent Office as the International Searching Authority for International Application No. PCT/JP2018/027534.
(Continued)

*Primary Examiner* — Dominick L Plakkoottam
(74) *Attorney, Agent, or Firm* — Buchanan Ingersoll & Rooney PC

(57) ABSTRACT

A rotation driving device includes: a casing; a stator holding part; a cylindrical member; a flange extending from an end of the cylindrical member in the axial direction toward a rotating shaft, and facing an end of the stator holding part in the axial direction; and a fastening member fastened to the end of the stator holding part in the axial direction via the flange. The flange has a through-hole extending through the
(Continued)

flange in the axial direction, and in which the fastening member is inserted. The through-hole has a diameter smaller than that of a head of the fastening member, and larger than that of a screw part of the fastening member. The rotating shaft, the rotor, the stator, the stator holding part, and the cylindrical member are arranged in this order in the radial direction in the casing, and are concentrically arranged.

11 Claims, 8 Drawing Sheets

(51) Int. Cl.
| | |
|---|---|
| *F04D 29/34* | (2006.01) |
| *F04D 29/32* | (2006.01) |
| *F04D 19/00* | (2006.01) |
| *H02K 7/14* | (2006.01) |
| *F04D 29/64* | (2006.01) |
| *H02K 5/16* | (2006.01) |
| *H02K 7/09* | (2006.01) |

(52) U.S. Cl.
CPC .......... *F04D 29/058* (2013.01); *F04D 29/325* (2013.01); *F04D 29/34* (2013.01); *F04D 29/646* (2013.01); *H02K 5/161* (2013.01); *H02K 7/09* (2013.01); *H02K 7/14* (2013.01); *F05B 2240/51* (2013.01); *F05B 2260/301* (2013.01)

(58) Field of Classification Search
CPC ........ H02K 5/1732; H02K 5/24; H02K 7/083; H02K 5/20; H02K 9/06; H02K 15/14; H02K 21/046; H02K 5/161; H02K 7/09; F04D 25/0606; F04D 25/082; F04D 17/165; F04D 29/403; F04D 29/444; F04D 29/603; F04D 17/164; F04D 29/4226; F04D 29/44; F04D 29/441; F04D 29/58; F04D 19/002; F04D 19/007; F04D 29/058; F04D 29/281; F04D 29/325; F04D 29/34; F04D 29/582; F04D 29/646
See application file for complete search history.

(56) References Cited

U.S. PATENT DOCUMENTS

| | | | | |
|---|---|---|---|---|
| 8,648,514 | B2* | 2/2014 | Arita | H02K 21/046 |
| | | | | 310/181 |
| 8,882,457 | B2* | 11/2014 | Bosen | F04D 29/051 |
| | | | | 415/198.1 |
| 9,261,104 | B2* | 2/2016 | Stock | F04D 29/5806 |
| 9,634,456 | B2 | 4/2017 | Funaoka et al. | |
| 10,124,135 | B2* | 11/2018 | Kenyon | A61M 16/0858 |
| 10,396,640 | B2* | 8/2019 | Kenyon | H02K 5/08 |
| 10,517,448 | B2* | 12/2019 | Shiozawa | F04D 25/06 |
| 2014/0056740 | A1* | 2/2014 | Yim | F04D 25/0606 |
| | | | | 417/423.7 |
| 2018/0160872 | A1* | 6/2018 | Hayamitsu | F04D 29/441 |
| 2018/0163747 | A1* | 6/2018 | Hayamitsu | H02K 9/14 |
| 2019/0038857 | A1* | 2/2019 | Kenyon | F04D 17/165 |
| 2019/0334418 | A1* | 10/2019 | Kenyon | H02K 5/128 |
| 2019/0365167 | A1* | 12/2019 | Jung | H02K 9/06 |
| 2020/0195091 | A1* | 6/2020 | Kim | H02K 7/14 |

FOREIGN PATENT DOCUMENTS

| | | |
|---|---|---|
| JP | 5742560 A | 7/2015 |
| JP | 2017127150 A | 7/2017 |
| KR | 101343876 B1 | 12/2013 |
| WO | 2015093076 A1 | 6/2015 |

OTHER PUBLICATIONS

Written Opinion (PCT/ISA/237) dated Sep. 18, 2018, by the Japan Patent Office as the International Searching Authority for International Application No. PCT/JP2018/027534.
Office Action dated Jun. 24, 2021, by the Chinese Patent Office in corresponding Chinese Patent Application No. 201880049283.5 and English translation of the Office Action. (23 pages).
Office Action dated Mar. 2, 2021 issued in corresponding Korean Patent Application No. 10-2020-7001851, with English translation (11 pages).

* cited by examiner

ROTATION DRIVING DEVICE, METHOD FOR MOUNTING ROTATION DRIVING DEVICE, AXIAL BLOWER, METHOD FOR MOUNTING AXIAL BLOWER, AND LASER OSCILLATOR

FIELD

The present invention relates to a rotation driving device including a motor, a method for mounting the rotation driving device, an axial blower, a method for mounting the axial blower, and a laser oscillator.

BACKGROUND

Patent Literature 1 teaches a method for mounting an electrical rotating machine and a structure thereof capable of aligning the central axis of a rotor and the central axis of a stator with each other with high accuracy. The method for mounting the electrical rotating machine taught in Patent Literature 1 is a method of mounting a case cover with a rotor on a case in which the stator is accommodated. The case cover includes a cover member, a shaft integrally mounted on the cover member via a flange member, a rotor core provided on the flange member, and a permanent magnet embedded in the rotor core. A flanged portion is provided on the inner side of the cover member. When the case cover and the case with the stator are assembled together, the flanged portion is used for measuring magnet reaction force generated at the cover member in response to attraction force between the permanent magnet of the rotor and the stator core that is a magnetic member. The flanged portion is concentrically provided around the center position of the cover member. In the method for mounting the electrical rotating machine taught in Patent Literature 1, the case cover is turned by 360 degrees by using the flanged portion, the eccentricity of the case cover relative to the case is measured over the whole circumference of the flanged portion, the position of the case cover relative to the case is adjusted so that the eccentricity becomes uniform over one period of rotation, and the case cover is then fastened.

A laser oscillator taught in Patent Literature 2 includes an oscillator housing in which laser medium gas is encapsulated. The oscillator housing is provided therein with a discharging unit including a pair of discharge electrodes used for discharge pumping of the laser medium gas, an axial blower that circulates the laser medium gas, and a heat exchanger that cools the laser medium gas.

CITATION LIST

Patent Literature

Patent Literature 1: Japanese Patent No. 5742560 Patent Literature 2: International Publication No. WO 2015/093076

SUMMARY

Technical Problem

In recent years, there have been demands for higher output and smaller size of laser oscillators, and it is necessary to increase the performance of cooling the laser medium gas in laser oscillators. In order to increase the performance of cooling the laser medium gas, it is effective to increase the rotation speed of the axial blower that circulates the laser medium gas. According to the related arts, however, the bending natural frequency of a rotating body included in the axial blower becomes lower as the rotation speed increases, thereby increasing the rotation speed is difficult.

The present invention has been made in view of the above, and an object thereof is to provide a rotation driving device capable of rotating at high speeds.

Solution to Problem

A rotation driving device according to an aspect of the present invention includes: a rotating shaft; a rotor provided on an outer circumference of the rotating shaft; a stator provided on an outer circumference of the rotor; a casing accommodating the stator; a pair of bearings correspondingly provided at both ends of the rotating shaft and supporting the rotating shaft; a pair of bearing holding parts correspondingly provided at both ends of the casing and holding the bearings; a stator holding part provided on an outer circumference of the stator; a cylindrical member provided on an outer circumference of the stator holding part; a flange extending from an end of the cylindrical member in an axial direction toward the rotating shaft, and facing an end of the stator holding part in the axial direction; and a fastening member fastened to the end of the stator holding part in the axial direction via the flange, wherein the flange has a through-hole extending through the flange in the axial direction and in which the fastening member is inserted, the through-hole has a diameter smaller than that of a head of the fastening member and larger than that of a screw part of the fastening member, the rotating shaft, the rotor, the stator, the stator holding part, and the cylindrical member are arranged in this order in a radial direction in the casing, and the rotating shaft, the rotor, the stator, the stator holding part, and the cylindrical member are concentrically arranged.

Advantageous Effects of Invention

The rotation driving device according to the present invention produces an effect of rotating at high speeds.

DESCRIPTION OF EMBODIMENTS

A rotation driving device, a method for mounting the rotation driving device, an axial blower, a method for mounting the axial blower, and a laser oscillator according to embodiments of the present invention will be described in detail below with reference to the drawings. Note that the present invention is not limited to the embodiments.

First Embodiment

Figure 1:
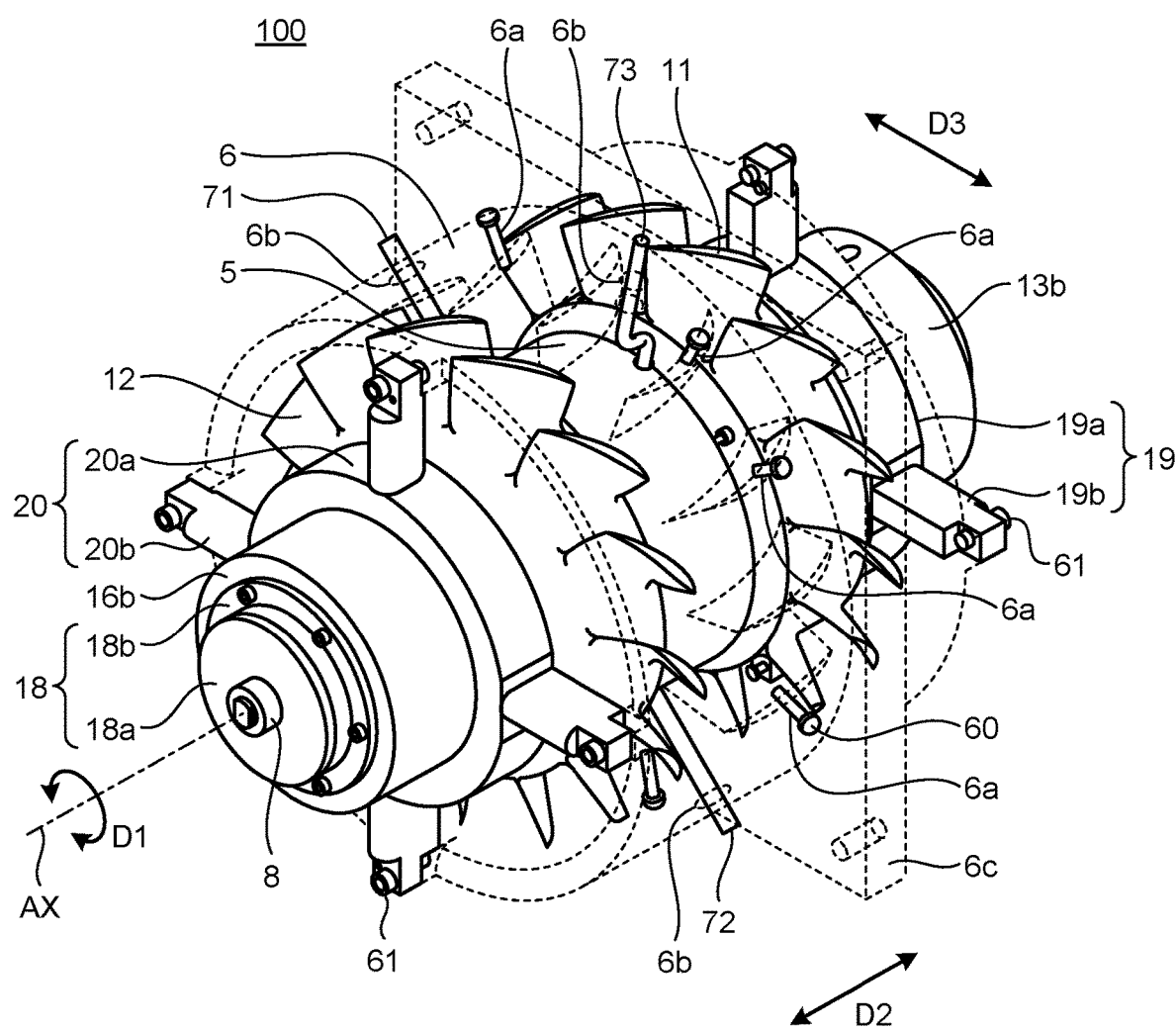
FIG. 1 is a perspective view of an axial blower according to a first embodiment.
Figure 2:
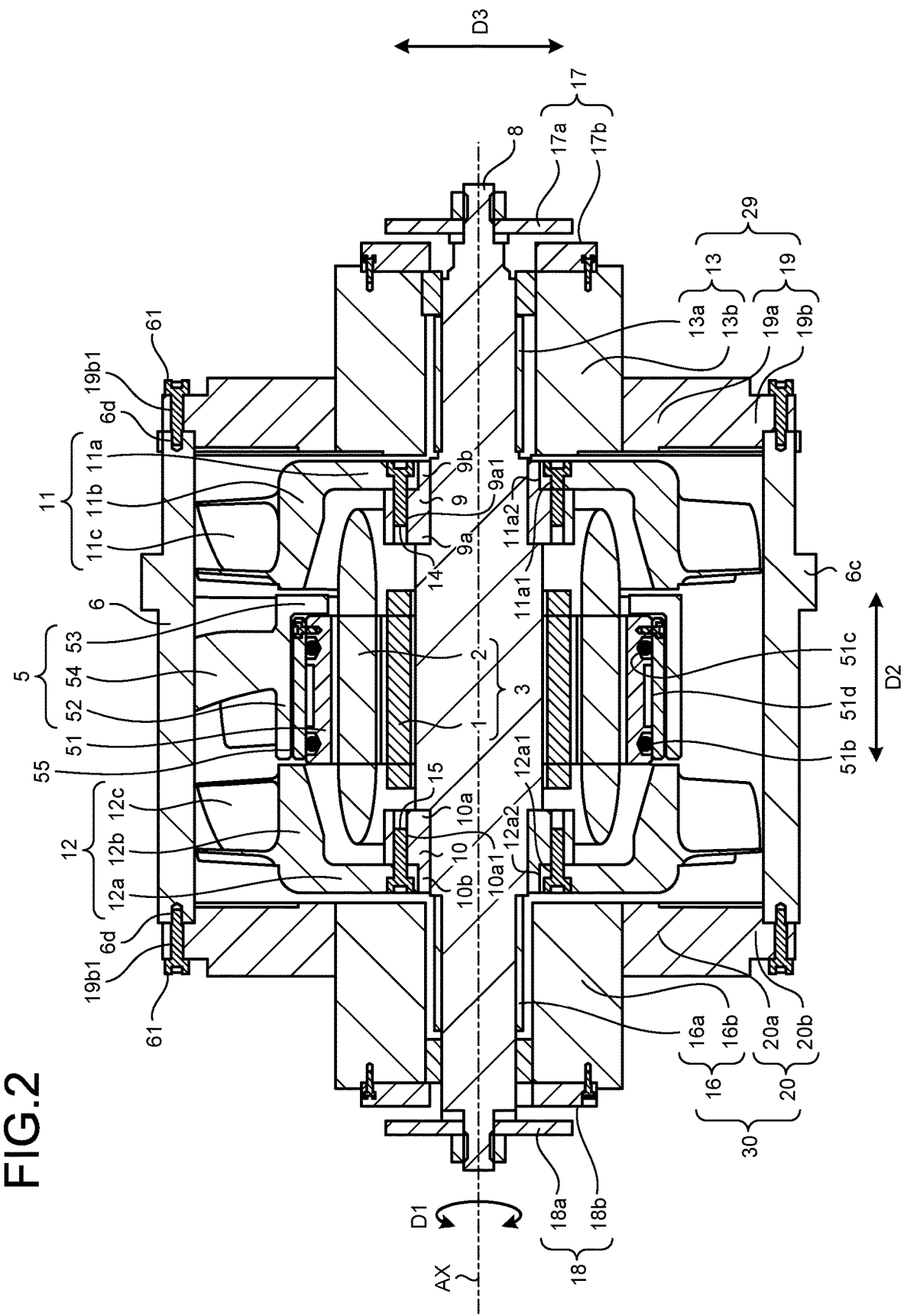
FIG. 2 is a first cross-sectional view of the axial blower according to the first embodiment.
Figure 3:
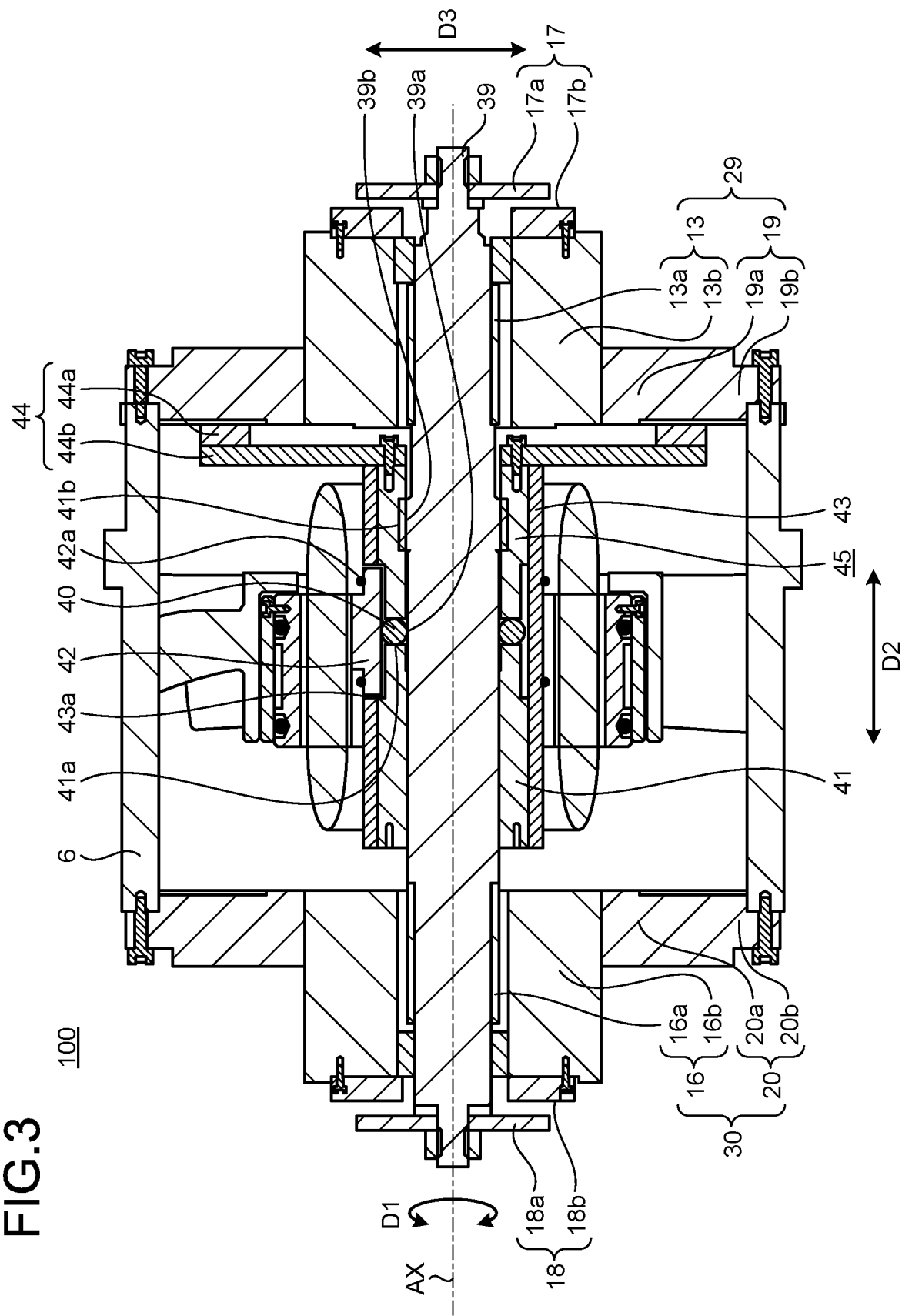
FIG. 3 is a second cross-sectional view of the axial blower according to the first embodiment.
Figure 4:
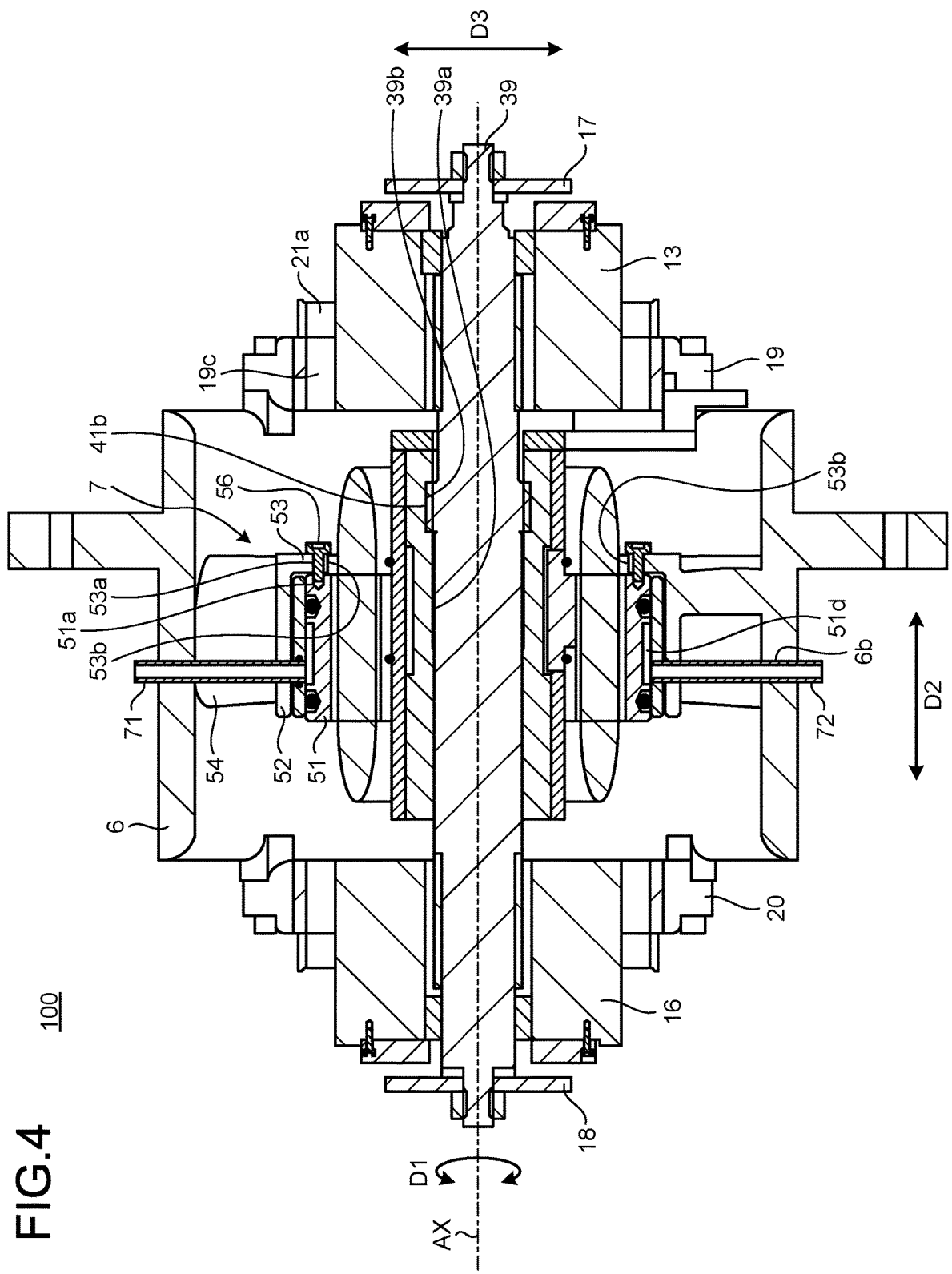
FIG. 4 is a third cross-sectional view of the axial blower according to the first embodiment.
Figure 5:
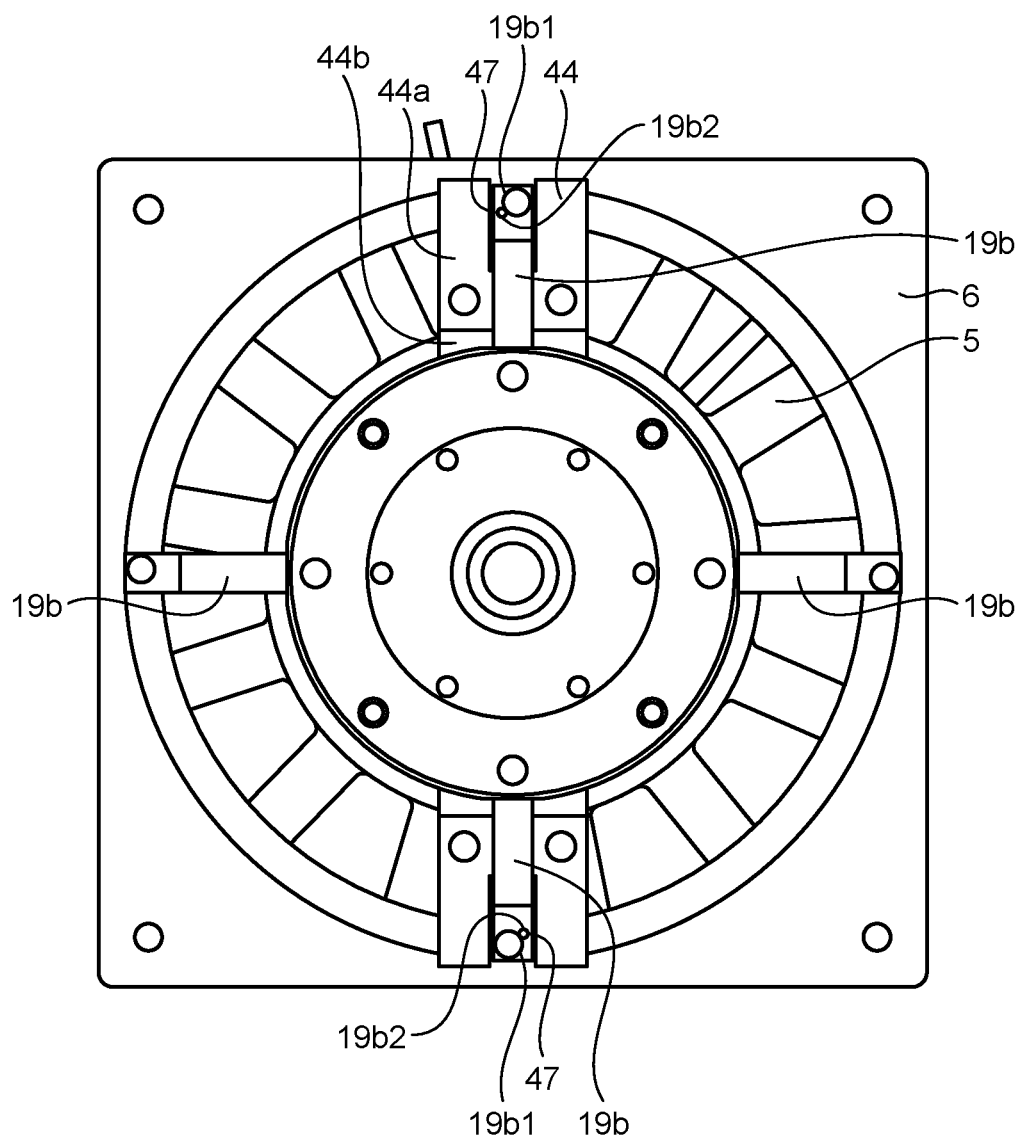
FIG. 5 is a view of the axial blower according to the first embodiment as seen in the axial direction.

FIG. 1 is a perspective view of an axial blower according to a first embodiment. FIG. 2 is a first cross-sectional view of the axial blower according to the first embodiment. FIG. 3 is a second cross-sectional view of the axial blower according to the first embodiment. FIG. 4 is a third cross-sectional view of the axial blower according to the first embodiment. FIG. 5 is a view of the axial blower according to the first embodiment as seen in the axial direction. The central axis is denoted by a sign AX. The central axis AX corresponds to the center in the radial direction of each of a casing 6, a rotating shaft 8, a rotor 1, and a stator 2. The circumferential direction around the central axis AX is denoted by an arrow D1. The axial direction that is the extending direction of the central axis AX is denoted by an arrow D2. The radial direction of the casing 6 is denoted by an arrow D3. The radial direction D3 is identical to a direction perpendicular to the axial direction D2. FIGS. 2 to 4 illustrate the axial blower 100 as seen from different angles in the circumferential direction D1, and FIGS. 2 to 5 are views for explaining an eccentricity adjustment process. A configuration of an axial blower 100 according to the first embodiment will be described below with reference to FIGS. 1 to 5.

The axial blower 100 includes the casing 6 having a cylindrical shape, the rotating shaft 8 extending in the axial direction D2, a motor 3 that drives the rotation of the rotating shaft 8, a first stator vane assembly 5, a first rotating blade assembly 11, a second rotating blade assembly 12, a first thrust magnetic bearing 17, a second thrust magnetic bearing 18, a first radial magnetic bearing part 29, and a second radial magnetic bearing part 30.

The casing 6 is a member made of an aluminum alloy, an austenitic stainless steel alloy, a copper alloy, cast iron, steel, or an iron alloy, formed into a cylindrical shape. The casing 6 has a plurality of through-holes 6a, a plurality of through-holes 6b, a base 6c, and a plurality of screw holes 6d.

The through-holes 6a are cavities extending through the casing 6 from an outer face to an inner face thereof. The through-holes 6a are spaced from each other along the circumferential direction D1. A screw 60 is inserted in each of the through-holes 6a. The leading ends of the screws 60 inserted in the through-holes 6a stick out from the inner face of the casing 6 inward in the radial direction D3, and screwed into vanes 54. The vanes 54 are components of the first stator vane assembly 5. Details of the first stator vane assembly 5 will be described later.

The through-holes 6b are cavities extending through the casing 6 from the outer face to the inner face thereof. The through-holes 6b are spaced from each other along the circumferential direction D1. An inlet pipe 71 for coolant circulation, an outlet pipe 72 for coolant circulation, or a power line 73 of a stator coil is inserted in each of the through-holes 6b. The leading ends in the radial direction D3 of the inlet pipe 71 and the outlet pipe 72 reach a stator holding part 51 as illustrated in FIG. 4.

The base 6c is located outside the casing 6. The base 6c may be formed integrally with the casing 6 by die-casting using the same material as that of the casing 6, or may be formed by die-casting using the same material as that of the casing 6 and thereafter welded to the casing 6. The base 6c is an attaching member for fixing the axial blower 100 to a housing of a laser oscillator, which will be described later.

The shape of the base 6c is not limited to a plate shape as long as the base 6c fixes the axial blower 100 to the housing of the laser oscillator.

The screw holes 6d are holes formed at both ends of the casing 6. The screw holes 6d are spaced from each other along the circumferential direction D1. Screws 61 are inserted in the screw holes 6d. The screws 61 are fastening members for fixing a first bearing holding part 19 and a second bearing holding part 20 to the casing 6. Details of the structures of the first bearing holding part 19 and the second bearing holding part 20 will be described later.

The rotating shaft 8 is a member made of an aluminum alloy, an austenitic stainless steel alloy, a copper alloy, cast iron, steel, or an iron alloy, formed into a columnar shape. The rotating shaft 8 is an output shaft extending along the central axis AX.

The motor 3 that drives the rotation of the rotating shaft 8 is an electrical rotating machine that drives the rotating shaft 8 by a driver, which is not illustrated, with specific outputs at specific speed. The motor 3 may be either of an induction motor and a permanent magnet motor. The motor 3 includes the stator 2 located inside the casing 6, and the rotor 1 located inside the stator 2 and along the outer circumference of the rotating shaft 8.

The stator 2 faces the outer face of the rotor 1 in the radial direction D3. The stator 2 is concentrically placed around the central axis AX. The stator 2 includes a stator core that is a cylindrical magnetic member, and a stator winding. The rotor 1 is located at the center in the axial direction D2 of the rotating shaft 8 within a region inside the stator 2. The rotor 1 is concentrically placed around the central axis AX. The rotor 1 is a cylindrical magnetic member. The rotating shaft 8 is supported by a first radial magnetic bearing 13 and a second radial magnetic bearing 16, so that the rotor 1 is supported by the casing 6. The rotation of the rotor 1 rotates the rotating shaft 8. While the rotor 1 is fitted in the outer circumference of the rotating shaft 8 in the present embodiment, the rotating shaft 8 may be embedded in the rotor 1.

The first stator vane assembly 5 includes a vane base part 52 that is a cylindrical member, a flange 53, and the vanes 54. Examples of the materials for the vane base part 52, the flange 53, and the vanes 54 include an aluminum alloy, an austenitic stainless steel alloy, a copper alloy, cast iron, steel, and an iron alloy.

The vane base part 52 is a cylindrical member extending in the axial direction D2. The vane base part 52 is concentrically placed around the central axis AX. The vane base part 52 is located outside the stator holding part 51 with a space from the outer circumference of the stator holding part 51. The stator holding part 51 is a cylindrical member extending in the axial direction D2. The stator holding part 51 is concentrically placed around the central axis AX. The stator holding part 51 is provided to cover the outer circumference of the stator 2. The stator holding part 51 has a groove 51d that is a coolant passage for cooling the motor 3, O-rings 51b each of which is a sealing member, and annular grooves 51c in which the O-rings 51b are correspondingly inserted. The O-rings 51b are inserted in the annular grooves 51c of the stator holding part 51, an annular cover 55 for sealing to prevent the coolant from leaking is fitted in the outer circumference of the stator holding part 51 in such a manner that the cover 55 presses the O-rings 51b. The cover 55 fitted in the stator holding part 51 is fixed to the stator holding part 51 by screwing. The cover 55 has through-holes extending in the radial direction D3. As illustrated in FIG. 4, the leading ends of the inlet pipe 71 and the outlet pipe 72 are correspondingly connected with the through-holes. In this manner, the inlet pipe 71 and the outlet pipe 72 communicate with the groove 51d of the stator holding part 51.

A plurality of vanes 54 are mounted along the outer circumference of the vane base part 52. The vanes 54 may be formed integrally with the vane base part 52 by die-casting using the same material as that of the vane base part 52, or may be formed by die-casting using the same material as that of the vane base part 52 and thereafter welded to the vane base part 52. The vanes 54 are spaced from each other along the circumferential direction D1. The outer end in the radial direction D3 of each of the vanes 54 is in contact with the inner side of the casing 6.

The flange 53 is provided at an end in the axial direction D2 of the vane base part 52. The flange 53 may be formed integrally with the vane base part 52 by die-casting using the same material as that of the vane base part 52, or may be formed by die-casting using the same material as that of the vane base part 52 and thereafter welded to the vane base part 52. The flange 53 is an annular member that extends from the end in the axial direction D2 of the vane base part 52, which is a cylindrical member, toward the rotating shaft 8. The flange 53 faces the end in the axial direction D2 of the stator holding part 51. The flange 53 has an inner diameter that is smaller than the outer diameter of the stator holding part 51 and larger than the outer diameter of the stator winding. The inner circumference of the flange 53 is not in contact with the stator winding. In FIG. 4, the inner diameter of the flange 53 is substantially equal to the inner diameter of the stator holding part 51.

As illustrated in FIG. 4, the flange 53 has through-holes 53a. Each of the through-holes 53a is a hole in which a fastening member 56 for adjusting the eccentricity of the motor 3. The through-hole 53a extends through the flange 53 in the axial direction D2. The through-hole 53a has a diameter smaller than a head of the fastening member 56 and larger than a screw part of the fastening member 56. Note that the screw part of the fastening member 56 has an external thread structure that can be screwed into a hole 51a formed in the stator holding part 51. An example of the fastening member 56 is a bolt. A clearance 53b is provided between the wall face of the through-hole 53a and the outer circumference of the screw part of the fastening member 56 in a state in which the screw part of the fastening member 56 is inserted in the through-hole 53a. The clearance 53b enables the position of the stator 2 to be shifted in the radial direction D3 in the eccentricity adjustment process, which will be described later.

The screws 60 illustrated in FIG. 1 are screwed into the vanes 54 of the first stator vane assembly 5, so that the first stator vane assembly 5 is fixed to the casing 6. As a result, the stator 2 located inside the first stator vane assembly 5 is indirectly fixed to the casing 6. Specifically, the stator holding part 51 is fitted in the outer circumference of the stator 2, the stator holding part 51 is fitted to the flange 53 on the inner side of the vane base part 52, and thus the stator 2 is fixed to the casing 6.

As illustrated in FIG. 4, the first stator vane assembly 5 fixed to the casing 6 also serves as an eccentricity adjusting part 7 of the motor 3. The eccentricity adjusting part 7 is constituted by the hole 51a formed in the stator holding part 51, the fastening member 56, and the through-hole 53a. An internal screw is formed on the inner wall of the hole 51a. In the eccentricity adjustment process of the motor 3, which will be described later, the ends of the stator holding part 51 and the flange 53 in the axial direction are caused to be brought into contact with each other, and the position of the central axis AX of the stator 2 in the radial direction D3 is adjusted via the casing 6 on the basis of the central axis AX of the rotor 1 as a reference. Thereafter, the fastening member 56 is fixed into the hole 51a formed in the end face of the stator holding part 51. Details of the eccentricity adjustment process of the motor 3 will be described later.

The first rotating blade assembly 11 is located between the first stator vane assembly 5 and the first bearing holding part 19. The first rotating blade assembly 11 includes a back plate part 11a, a cylindrical part 11b, and a plurality of blades 11c. Examples of the materials for the first rotating blade assembly 11, the cylindrical part 11b, and the blades 11c include an aluminum alloy, an austenitic stainless steel alloy, a copper alloy, cast iron, steel, and an iron alloy.

The back plate part 11a is a disc-shaped member fixed to a first rotating blade assembly holding part 9. The back plate part 11a has a plurality of through-holes 11a1 extending in the axial direction D2. The through-holes 11a1 are spaced from each other along the circumferential direction D1. Rotating blade attaching screws 14 are inserted in the through-holes 11a1. The back plate part 11a has a rotating blade holding hole 11a2 at the center in the radial direction D3.

The first rotating blade assembly holding part 9 is an annular member located between the rotor 1 and the first bearing holding part 19. Examples of the material for the first rotating blade assembly holding part 9 include an aluminum alloy, an austenitic stainless steel alloy, a copper alloy, cast iron, steel, and an iron alloy. The first rotating blade assembly holding part 9 is located on the outer circumference of the rotating shaft 8 and fixed to the rotating shaft 8.

The first rotating blade assembly holding part 9 includes a first annular portion 9a, and a second annular portion 9b located on the side of the first bearing holding part 19 with respect to the first annular portion 9a. The first annular portion 9a has an outer diameter smaller than the inner diameter of the stator winding. The first annular portion 9a has a through-hole at the center in the radial direction D3. The through-hole is a hole through which the rotating shaft 8 extends. The first annular portion 9a also has through-holes 9a1 in which the rotating blade attaching screws 14 for fixing the first rotating blade assembly 11 are inserted. The through-holes 9a1 are formed at outer positions in the radial direction D3 of the first rotating blade assembly holding part 9, and spaced from each other along the circumferential direction D1. The second annular portion 9b has a diameter smaller than that of the first annular portion 9a. The inner face of the rotating blade holding hole 11a2 of the back plate part 11a is in contact with the outer face of the second annular portion 9b. The rotating blade attaching screws 14 are screwed into the through-holes 11a1 of the back plate part 11a and the through-holes 9a1 of the first annular portion 9a in a state in which the inner face of the rotating blade holding hole 11a2 is in contact with the outer face of the second annular portion 9b. As a result, the back plate part 11a is fixed to the first rotating blade assembly holding part 9.

The cylindrical part 11b is a cylindrical member located on the outside of the back plate part 11a in the radial direction D3, and extending from the back plate part 11a toward the first stator vane assembly 5. The blades 11c are located on the outside of the cylindrical part 11b in the radial direction D3, and extend from the cylindrical part 11b toward the inner face of the casing 6. The blades 11c are spaced from each other along the circumferential direction D1.

The second rotating blade assembly 12 is located between the first stator vane assembly 5 and the second bearing holding part 20. The second rotating blade assembly 12 includes a back plate part 12a, a cylindrical part 12b, and a plurality of blades 12c. Examples of the materials for the second rotating blade assembly 12, the cylindrical part 12b, and the blades 12c include an aluminum alloy, an austenitic stainless steel alloy, a copper alloy, cast iron, steel, and an iron alloy.

The back plate part 12a is a disc-shaped member fixed to a second rotating blade assembly holding part 10.

The back plate part 12a has a plurality of through-holes 12a1 extending in the axial direction D2. The through-holes 12a1 are spaced from each other along the circumferential direction D1. Rotating blade attaching screws 15 are inserted in the through-holes 12a1. The back plate part 12a has a rotating blade holding hole 12a2 at the center in the radial direction D3.

The second rotating blade assembly holding part 10 is an annular member located between the rotor 1 and the second bearing holding part 20. Examples of the material for the second rotating blade assembly holding part 10 include an aluminum alloy, an austenitic stainless steel alloy, a copper alloy, cast iron, steel, and an iron alloy. The second rotating blade assembly holding part 10 is located on the outer circumference of the rotating shaft 8 and fixed to the rotating shaft 8.

The second rotating blade assembly holding part 10 includes a first annular portion 10a, and a second annular portion 10b located on the side of the second bearing holding part 20. The first annular portion 10a has an outer diameter smaller than the inner diameter of the stator winding. The first annular portion 10a has a through-hole at the center in the radial direction D3. The through-hole is a hole through which the rotating shaft 8 extends. The first annular portion 10a also has screw through-holes 10a1 in which the rotating blade attaching screws 15 for fixing the second rotating blade assembly 12 are inserted. The screw through-holes 10a1 are formed at outer positions in the radial direction D3 of the second rotating blade assembly holding part 10, and spaced from each other along the circumferential direction D1. The second annular portion 10b has a diameter smaller than that of the first annular portion 10a. The inner face of the rotating blade holding hole 12a2 of the back plate part 12a is in contact with the outer face of the second annular portion 10b. The rotating blade attaching screws 15 are screwed into the through-holes 12a1 of the back plate part 12a and the screw through-holes 10a1 of the first annular portion 10a in a state in which the inner face of the rotating blade holding hole 12a2 is in contact with the outer face of the second annular portion 10b. As a result, the back plate part 12a is fixed to the second rotating blade assembly holding part 10.

The cylindrical part 12b is a cylindrical member located on the outside of the back plate part 12a in the radial direction D3, and extending from the back plate part 12a toward the first stator vane assembly 5. The blades 12c are located on the outside of the cylindrical part 12b in the radial direction D3, and extend from the cylindrical part 12b toward the inner face of the casing 6. The blades 12c are spaced from each other along the circumferential direction D1.

The first thrust magnetic bearing 17 is a magnetic bearing included in the first radial magnetic bearing part 29, and receiving a load in the thrust direction of the rotating shaft 8. The first thrust magnetic bearing 17 includes a rotating part 17a and a fixed part 17b. The rotating part 17a is located on the side opposite to the first rotating blade assembly 11 with respect to the first radial magnetic bearing 13. The rotating part 17a is mounted on the rotating shaft 8, and rotates with the rotating shaft 8. The position of the rotating part 17a is close to the end of the rotating shaft 8 protruding from the first bearing holding part 19. The fixed part 17b is fixed to the end of the first radial magnetic bearing 13 in the axial direction D2, and faces the rotating part 17a in the axial direction D2. Metal is used as a material of the rotating part 17a, and an electromagnet is used for the fixed part 17b.

The second thrust magnetic bearing 18 is a magnetic bearing mounted to in the second radial magnetic bearing part 30, and receiving a load in the thrust direction of the rotating shaft 8. The second thrust magnetic bearing 18 includes a rotating part 18a and a fixed part 18b. The rotating part 18a is located on the side opposite to the second rotating blade assembly 12 with respect to the second radial magnetic bearing 16. The rotating part 18a is mounted on the rotating shaft 8, and rotates with the rotating shaft 8. The position of the rotating part 18a is close to the end of the rotating shaft 8 protruding from the second bearing holding part 20. The fixed part 18b is fixed to the end of the second radial magnetic bearing 16 in the axial direction D2, and faces the rotating part 18a in the axial direction D2. Metal is used as a material of the rotating part 18a, and an electromagnet is used for the fixed part 18b.

Note that the first thrust magnetic bearing 17 and the second thrust magnetic bearing 18 may be provided at the ends of the rotating shaft 8, or may be provided on either one of the ends of the rotating shaft 8.

The first radial magnetic bearing part 29 includes the first bearing holding part 19 located at one end of the casing 6 in the axial direction D2, and the first radial magnetic bearing 13 located on the inner side of the first bearing holding part 19.

The first bearing holding part 19 includes a cylindrical part 19a and a plurality of support beam parts 19b. The cylindrical part 19a has an outer diameter that is smaller than the outer diameter of the vane base part 52 of the first stator vane assembly 5 and smaller than the outer diameter of the cylindrical part 11b of the first rotating blade assembly 11, and that does not block a flow passage of laser medium gas.

As illustrated in FIG. 4, the cylindrical part 19a has a through-hole 19c. The through-hole 19c is a hole extending through the cylindrical part 19a in the axial direction D2. The through-hole 19c has a diameter larger than that of a fastening tool, which is not illustrated. The fastening tool is a tool for fastening the fastening member 56 into the hole 51a of the stator holding part 51. Specifically, the fastening tool is a tool used for fixing the flange 53 to the stator holding part 51 with the fastening member 56.

As illustrated in FIG. 2, the support beam parts 19b extend from the outer circumference of the cylindrical part 19a in the radial direction D3. The support beam parts 19b are located on the flow passage of the laser medium gas, and are thus formed in a beam-like shape so as not to block the flow of the laser medium gas. As illustrated in FIG. 1, the support beam parts 19b are spaced from each other in the circumferential direction D1, and at intervals of a mechanical angle of 90°.

As illustrated in FIG. 5, the support beam parts 19b have, at portions close to the ends thereof, screw holes 19b1 that extend therethrough in the axial direction D2, and pin holes 19b2. The screw holes 19b1 are through-holes in which the screws 61 for fixing the support beam parts 19b to the casing 6 are inserted. The pin holes 19b2 are holes for positioning into which pins 47 provided on the casing 6 are fit. The pin holes 19b2 are formed along the radial direction D3 in which the own weight of the rotating body is applied. Specifically, a pin hole 19b2 is formed in each of two support beam parts 19b extending in the vertical direction of the cylindrical part 19a. The pins 47 have a shape extending from an end face of the casing 6 in the axial direction D2. The pins 47 are provided along the radial direction D3 in which the own weight of the rotating body is applied. Specifically, the pins 47 are provided at two positions, which are an upper position and a lower position, on the end face of the casing 6. The second bearing holding part 20 also has structures similar to the screw holes 19b1 and the pin holes 19b2.

The screws 61 are inserted in the screw holes 6d of the casing 6 and the screw holes 19b1 of the support beam parts 19b in a state in which the pins 47 provided on the casing 6 are fitted into the pin holes 19b2 and the support beam parts 19b are in contact with the end face of the casing 6. As a result, the support beam parts 19b are fixed to the casing 6. Use of the pins 47 in fixing the bearing holding parts to the casing 6 enables the bearing holding parts to be positioned and fixed to the casing 6 with high accuracy in the radial direction D3 in which the own weight of the rotating body is applied.

The first radial magnetic bearing 13 includes a rotating part 13a and a fixed part 13b. The rotating part 13a is a cylindrical member that is mounted on the rotating shaft 8, and rotates with the rotating shaft 8. The position of the rotating part 13a is a region close to the first rotating blade assembly 11 within a region on the inner side of the cylindrical part 19a of the first bearing holding part 19. The fixed part 13b is located between the rotating part 13a and the cylindrical part 19a. The fixed part 13b is fixed to the inner side of the cylindrical part 19a, and faces the rotating part 13a in the radial direction D3. Metal is used as a material of the rotating part 13a, and an electromagnet is used for the fixed part 13b.

The second radial magnetic bearing part 30 includes the second bearing holding part 20 located at the other end of the casing 6 in the axial direction D2, and the second radial magnetic bearing 16 located on the inner side of the second bearing holding part 20.

The second bearing holding part 20 includes a cylindrical part 20a and a plurality of support beam parts 20b. The cylindrical part 20a has an outer diameter that is smaller than the outer diameter of the vane base part 52 of the first stator vane assembly 5 and smaller than the outer diameter of the cylindrical part 12b of the second rotating blade assembly 12, and that does not block the flow passage of the laser medium gas.

The support beam parts 20b extend from the outer circumference of the cylindrical part 20a in the radial direction D3. The support beam parts 20b are located on the flow passage of the laser medium gas, and are thus formed in a beam-like shape so as not to block the flow of the laser medium gas. As illustrated in FIG. 1, the support beam parts 20b are spaced from each other in the circumferential direction D1, and at intervals of a mechanical angle of 90°.

The second radial magnetic bearing 16 includes a rotating part 16a and a fixed part 16b. The rotating part 16a is a cylindrical member that is mounted on the rotating shaft 8, and rotates with the rotating shaft 8. The position of the rotating part 16a is in a region close to the second rotating blade assembly 12 within a region on the inner side of the cylindrical part 20a of the second bearing holding part 20. The fixed part 16b is located between the rotating part 16a and the cylindrical part 20a. The fixed part 16b is fixed to the inner side of the cylindrical part 20a, and faces the rotating part 16a in the radial direction D3. Metal is used as a material of the rotating part 16a, and an electromagnet is used for the fixed part 16b.

In the axial blower 100 having the structure as described above, the rotor 1, the stator 2, the stator holding part 51, the vane base part 52, and the vanes 54 are arranged in this order from the central axis AX toward the inner face of the casing 6.

Next, a method for fixing the first rotating blade assembly 11 to the first rotating blade assembly holding part 9 will be described. The rotating blade holding hole 11a2 of the back plate part 11a is fitted to the second annular portion 9b of the first rotating blade assembly holding part 9. Subsequently, the rotating blade attaching screws 14 are screwed into the first rotating blade assembly holding part 9 in a state in which the back plate part 11a of the first rotating blade assembly 11 is caused to be in contact with the first annular portion 9a of the first rotating blade assembly holding part 9. In this manner, the first rotating blade assembly 11 is fixed to the first rotating blade assembly holding part 9. A method for fixing the second rotating blade assembly 12 to the second rotating blade assembly holding part 10 is similar to the above.

In the axial blower 100 having the structure as described above, the rotating shaft 8, the rotor 1, the first rotating blade assembly holding part 9, the second rotating blade assembly holding part 10, the first rotating blade assembly 11, the second rotating blade assembly 12, the rotating part 13a, and the rotating part 16a constitute a rotating body. The first rotating blade assembly 11 functions as a rotating blade assembly on laser medium gas suction side, and the second rotating blade assembly 12 functions as a rotating blade assembly on the laser medium gas discharge side. The rotating body rotates by receiving the rotation driving force from the motor 3 of the axial blower 100. The rotation of the rotating blade assemblies mounted on the rotating body blows the laser medium gas. In this process, a pressure difference is generated in the laser medium gas between the suction side and the discharge side of the axial blower 100, and a pressing force along the central axis AX of the rotating shaft 8 thus acts on the rotating body. The first thrust magnetic bearing 17 is used to prevent positional shifts of the rotating body caused by the pressing force. Specifically, the first thrust magnetic bearing 17 supports the rotating shaft 8 in the axial direction D2. Note that a thrust magnetic bearing position detecting sensor, which is not illustrated, is preferably provided at the first radial magnetic bearing 13 in order to increase the accuracy of positioning of the first thrust magnetic bearing 17. While the first thrust magnetic bearing 17 and the second thrust magnetic bearing 18 are used in the axial blower 100 according to the first embodiment, one thrust magnetic bearing on one of the both ends of the rotating shaft 8 may be used instead of the two thrust magnetic bearings. In a case where such a thrust magnetic bearing is used, fixed parts included in the thrust magnetic bearing are provided on the both sides of a rotating part included in the thrust magnetic bearing. Specifically, two fixed parts and one rotating part constituting the thrust magnetic bearing are arrange in the order of the fixed part, the rotating part, and the fixed part in the axial direction D2.

Note that the magnetic bearings used in the axial blower 100 may be any of active magnetic bearings, passive magnetic bearings, and hybrid magnetic bearings including an electromagnet and a permanent magnet. The thrust magnetic bearing position detecting sensor, which is not illustrated, may be either a capacitance (inductance) sensor or an eddy-current sensor.

<Procedures for Assembly of Axial Blower 100 (Operation)>

Procedures for assembly of the axial blower 100 will be described. First, the first radial magnetic bearing 13 is fixed to the first bearing holding part 19. In a similar manner, the second radial magnetic bearing 16 is fixed to the second bearing holding part 20. Once the stator 2 to which the stator holding part 51 is attached and the casing 6 to which the first stator vane assembly 5 is fixed are prepared, a process of temporarily positioning the central axis AX of the stator 2 is subsequently performed on the casing 6. For the temporary positioning, the end of the stator holding part 51 is brought into contact with the flange 53 of the vane base part 52, and the fastening member 56 is loosely fastened to the hole 51a of the stator holding part 51. To loosely fasten means to hold the stator 2 relative to the casing 6 to such an extent the stator 2 can be moved for adjustment. Because the through-hole 53a with the clearance 53b, which is a margin for eccentricity adjustment, is formed in the first stator vane assembly 5, the central axis AX of the stator 2 can be moved in the radial direction D3 of the stator 2. After the temporary positioning is completed, an eccentricity adjustment process of adjusting the position of the central axis AX of the stator 2 in the radial direction D3 is performed on the central axis AX of the rotor 1 via the casing 6 by using the centering adjustment jig 45 illustrated in FIGS. 3 and 5.

In the eccentricity adjustment process, the centering adjustment jig 45 is used. In FIGS. 3 and 4, components of the centering adjustment jig 45 used in the eccentricity adjustment process are illustrated. FIG. 5 illustrates the front of the axial blower 100 in the eccentricity adjustment process. As one example, the centering adjustment jig 45 includes a jig shaft 39, a plurality of stator axial center adjustment balls 40 arranged on the outer circumference of the jig shaft 39 along the circumferential direction D1, and a stator axial center adjustment ball holding part 41. The centering adjustment jig 45 also includes a plurality of stator axial center adjustment members 42, a cylindrical jig cover 43, a rotation stopping member 44, a resin band 42a, and the fastening member 56.

The jig shaft 39 is a dummy shaft shaped like the rotating shaft 8, and formed with an inclined portion 39a and a stator axial center adjustment external thread 39b. The inclined portion 39a is formed at a middle portion of the jig shaft 39 in the axial direction D2. The outer face of the inclined portion 39a is tapered with an outer diameter decreasing from one side to the other in the axial direction D2. The stator axial center adjustment external thread 39b is a screw formed on the outer circumference of the jig shaft 39.

The stator axial center adjustment balls 40 are spherical bodies arranged in contact with the outer circumference of the jig shaft 39 in the circumferential direction D1. The stator axial center adjustment ball holding part 41 has a cylindrical shape. The stator axial center adjustment ball holding part 41 is formed with stator axial center adjustment ball holding grooves 41a that hold the stator axial center adjustment balls 40, and a stator axial center adjustment internal thread 41b. The stator axial center adjustment ball holding grooves 41a are formed at a middle portion of the stator axial center adjustment ball holding part 41 in the axial direction D2. The stator axial center adjustment ball holding grooves 41a are holes spaced from each other in the circumferential direction D1 of the stator axial center adjustment ball holding part 41. The stator axial center adjustment ball holding grooves 41a are holes extending through the stator axial center adjustment ball holding part 41 in the radial direction D3, and have a round shape in plan view of the stator axial center adjustment ball holding part 41 in the radial direction D3. The stator axial center adjustment ball holding grooves 41a are formed at positions facing the inner circumference of the stator 2. The stator axial center adjustment internal thread 41b is an internal thread into which the stator axial center adjustment external thread 39b is fitted.

The stator axial center adjustment members 42 are plate-shaped members provided in stator axial center adjustment member grooves 43a of the jig cover 43. The jig cover 43 has a cylindrical shape covering the outer face of the stator axial center adjustment ball holding part 41. The stator axial center adjustment member grooves 43a are holes formed in the jig cover 43 to hold the stator axial center adjustment members 42. The stator axial center adjustment member grooves 43a are spaced from each other along the circumferential direction D1 of the jig cover 43. The shape of wall faces forming the stator axial center adjustment member grooves 43a is the same as that of the stator axial center adjustment members 42. Specifically, in plan view of the stator axial center adjustment members 42 in the radial direction D3, the stator axial center adjustment members 42 have a quadrangular contour, and in plan view of the stator axial center adjustment member grooves 43a in the radial direction D3, the wall faces forming the stator axial center adjustment member grooves 43a has a quadrangular contour. The stator axial center adjustment member grooves 43a are formed at a middle portion of the jig cover 43 in the axial direction D2. The stator axial center adjustment member grooves 43a are formed at positions facing the inner circumference of the stator 2. The stator axial center adjustment members 42 are held in the stator axial center adjustment member grooves 43a of the jig cover 43 by the resin band 42a. The resin band 42a is a member made of resin in an annular shape.

The rotation stopping member 44 is a member for preventing the stator axial center adjustment ball holding part 41 from turning. The rotation stopping member 44 includes a stopper member 44a and a support beam part 44b that supports the stopper member 44a. The stopper member 44a is located close to the outer end of the support beam part 44b in the radial direction D3. The stopper member 44a is located between the support beam part 44b and a support beam part 19b. An end of the stopper member 44a in the axial direction D2 is in contact with the support beam part 19b. The support beam part 44b is fixed to the end of the stator axial center adjustment ball holding part 41 in the axial direction D2. As illustrated in FIG. 3, the outer end of the support beam part 44b in the radial direction D3 is located at a position away from the inner face of the casing 6.

Next, procedures for assembly of the centering adjustment jig 45 will be described. The outer circumference of the jig shaft 39 is fitted to the inner circumference of the stator axial center adjustment ball holding part 41. Part of the stator axial center adjustment external thread 39b, which is formed at an end of the fitting portion, of the jig shaft 39 is screwed into the stator axial center adjustment internal thread 41b of the stator axial center adjustment ball holding part 41, so that the stator axial center adjustment ball holding part 41 is fixed to the jig shaft 39. The stator axial center adjustment ball holding grooves 41a of the stator axial center adjustment ball holding part 41 are formed in the outer circumference of the inclined portion 39a of the jig shaft 39.

The outer circumference of the stator axial center adjustment ball holding part 41 is fitted to the inner circumference of the jig cover 43. The position of the jig cover 43 in the circumferential direction D1 is adjusted so that the stator axial center adjustment member grooves 43a of the jig cover 43 are formed outside the stator axial center adjustment ball holding grooves 41a of the stator axial center adjustment ball holding part 41. After the stator axial center adjustment balls 40 are correspondingly provided in the stator axial center adjustment ball holding grooves 41a formed in the stator axial center adjustment ball holding part 41, the stator axial center adjustment members 42 are correspondingly provided in the stator axial center adjustment member grooves 43a formed in the jig cover 43. Furthermore, the resin band 42a is provided at the outer ends of the stator axial center adjustment members 42 in the radial direction, so that the stator axial center adjustment balls 40 and the stator axial center adjustment members 42 are loosely held by the jig shaft 39. To loosely hold means to hold to such an extent that the stator axial center adjustment balls 40 can move in the axial direction D2 of the jig shaft 39 and that the stator axial center adjustment members 42 can move in the radial direction D3. That the stator axial center adjustment balls 40 move in the axial direction D2 of the jig shaft 39 means that the stator axial center adjustment balls 40 move as the stator axial center adjustment external thread 39b is screwed into the stator axial center adjustment internal thread 41b. That stator axial center adjustment members 42 move in the radial direction D3 means that the stator axial center adjustment members 42 are pressed up in the radial direction D3 by the stator axial center adjustment balls 40 ascending the inclined portion 39a when the stator axial center adjustment external thread 39b is screwed into the stator axial center adjustment internal thread 41b. To ascend the inclined portion 39a means that the stator axial center adjustment balls 40 in contact with the outer face of inclined portion 39a having the tapered shape move away from the central axis AX in the radial direction D3. The stator axial center adjustment ball holding part 41 and the rotation stopping member 44 are fixed and integrated by the fastening member 56.

Next, procedures of the eccentricity adjustment process will be described. The stator axial center adjustment members 42 are provided so that the outer ends of the stator axial center adjustment members 42 in the radial direction face the inner side of the stator 2 after the temporary positioning process. After the support beam parts 19b of the first bearing holding part 19 are provided to be sandwiched and held by the stopper member 44a of the rotation stopping member 44 of the centering adjustment jig 45, the first bearing holding part 19 is fixed to the casing 6. Subsequently, the second bearing holding part 20 is fixed to the casing 6. The centering adjustment jig 45 is held on the casing 6 by the first radial magnetic bearing 13 and the second radial magnetic bearing 16. Only the jig shaft 39 of the centering adjustment jig 45 is rotated, and as the stator axial center adjustment external thread 39b is screwed into the stator axial center adjustment internal thread 41b, the stator axial center adjustment balls 40 ascend the inclined portion 39a of the jig shaft 39. The stator axial center adjustment balls 40 ascending the inclined portion 39a move the stator axial center adjustment members 42 in the radial direction D3 of the jig shaft 39. That is, the stator axial center adjustment members 42 are moved as if each of the stator axial center adjustment members 42 moves away from the jig shaft 39. The outer ends of the stator axial center adjustment members 42 in the radial direction come in contact with the inner side of the stator 2, and the temporarily positioned central axis AX of the stator 2 is moved in the radial direction D3 of the stator 2.

The stator axial center adjustment external thread 39b of the jig shaft 39 is screwed into the stator axial center adjustment internal thread 41b of the stator axial center adjustment ball holding part 41 until the outer ends of the stator axial center adjustment members 42 in the radial direction uniformly come in contact with the inner side of the stator 2. After the uniform contact of the outer ends of the stator axial center adjustment members 42 in the radial direction with the inner side of the stator 2 is confirmed, the positional relation between the stator 2 and the casing 6 is fixed. Specifically, a fastening tool is inserted in the through-hole 19c of the first bearing holding part 19 and the fastening member 56 is turned by the fastening tool in such a manner that the positional relation will not be deviated, and the fastening member 56 is thus screwed into the hole 51a of the stator holding part 51. As a result, the flange 53 comes in contact with the stator holding part 51 and is fixed to the stator holding part 51.

Thereafter, the first bearing holding part 19 is removed from the casing 6. Subsequently, the stator axial center adjustment external thread 39b screwed in the stator axial center adjustment internal thread 41b of the stator axial center adjustment ball holding part 41 is loosened, so that a clearance is created between the inner side of the stator 2 and the outer ends of the stator axial center adjustment members 42 in the radial direction, and the centering adjustment jig 45 is removed. Note that, in mounting of the jig shaft 39 on the first bearing holding part 19 and the second bearing holding part 20, the coaxiality and the rotating operation need to be ensured by clearance fit. Accordingly, the first bearing holding part 19 and the second bearing holding part 20 may thus include ball bearings or tapered sliding bearings.

As a result of the procedures described above, the position of the central axis AX of the stator 2 is aligned with the central axis AX of the rotating shaft 8 with high accuracy. After the eccentricity adjustment process, the rotating body is mounted on the casing 6. Note that the rotating body is a rotating body in which components other than the rotating blade assemblies and the rotating parts, which are components of the thrust magnetic bearings, are assembled and fixed. Specifically, the rotating body is constituted by components excluding the first rotating blade assembly 11, the second rotating blade assembly 12, the rotating part 17a, and the rotating part 18a from the motor 3, the first stator vane assembly 5, the rotating shaft 8, the first rotating blade assembly 11, the second rotating blade assembly 12, the rotating part 17a, and the rotating part 18a, illustrated in FIG. 1. Such a rotating body is prepared and provided on the inner side of the stator 2. Subsequently, the first rotating blade assembly 11 and the second rotating blade assembly 12 are correspondingly fixed to the both ends of the rotating body. The first bearing holding part 19 is fixed to the casing 6, the first radial magnetic bearing 13 is fixed to the first bearing holding part 19, and the fixed part 17b is fixed to the first radial magnetic bearing 13. The second bearing holding part 20 is fixed to the casing 6, the second radial magnetic bearing 16 is fixed to the second bearing holding part 20, and the fixed part 18b is fixed to the second radial magnetic bearing 16. Finally, the rotating part 17a, which is a component of the first thrust magnetic bearing 17, and the rotating part 18a, which is a component of the second thrust magnetic bearing 18 are fixed to the rotating shaft 8.

The position of the central axis AX of the rotor 1 in the radial direction D3 relative to the central axis AX of the casing 6 varies depending on the processing accuracy of the components, the accuracy of positioning of the casing 6 and the bearing holding parts, the accuracy of positioning of the radial magnetic bearings and the jig shaft 39, and the accuracy of the external dimension of the rotor 1. Provision of the eccentricity adjusting part 7 enables the position of the central axis AX of the stator 2 in the radial direction D3 to be aligned with the position of the central axis AX of the rotor 1 in the radial direction D3 fitted to the rotating shaft 8, with high accuracy in the eccentricity adjustment process without being affected by the processing accuracy of the components around the casing 6 and the accuracy of assembly of the components. In this manner, the position of the central axis AX of the stator 2 is aligned with the central axis AX of the rotor 1 via the casing 6 with high accuracy.

If the eccentricity adjusting part 7 is not provided and the central axis AX of the rotor 1 relative to the central axis AX of the stator 2 becomes eccentric, the clearance between the inner side of the stator 2 and the outer circumference of the rotor 1 is not uniform in the circumferential direction D1, that is, the attraction force generated between the stator 2 and the rotor 1 is not uniform in the circumferential direction D1. As the eccentricity of the central axis AX of the rotor 1 relative to the central axis AX of the stator 2 is larger, the attraction force generated in the electrical rotating machine is larger. Provision of the eccentricity adjusting part 7 enables the eccentricity to be smaller, and reduces the attraction force generated in the electrical rotating machine.

With the eccentricity adjusting part of the relate art, a casing and a flange of a bearing housing are provided at one position at one end of the casing, and the position of the central axis of the rotating shaft is adjusted relative to the central axis of the stator. In a case where rotating blade assemblies are provided on both sides of the rotor 1 as in the present embodiment, the distance from the position where the stator 2 and the rotor 1, which are components of the motor 3, are provided to the position where the eccentricity adjusting part 7 is provided becomes larger than that in the case where rotating blade assemblies are not provided on both sides of the rotor 1. Thus, there have been problems in that the rotating shaft 8 on which the rotating blade assemblies are mounted is deformed by the influence of the own weights of the rotating blade assemblies and the imbalance thereof, the eccentricity of the rotating shaft 8 cannot be measured accurately, and the increase in the eccentricity of the central axis AX of the rotor 1 relative to the central axis AX of the stator 2 cannot be suppressed. In addition, to keep the levelness of the rotating shaft 8 and make the clearance between the inner side of the stator 2 and the outer circumference of the rotor 1 uniform so that the rotating body does not come in contact with the bearings, the eccentricity adjusting parts of the related art need to be provided on both ends of the casing 6. When the eccentricity adjusting parts are provided at two positions, a mounting device for finely adjusting two bearing holding parts relative to the casing 6 is needed, which increases the manufacturing cost of the axial blower. Because the positions to be adjusted further increase, the measurement of the eccentricity of the rotating shaft 8 and the adjustment of the positions of the bearing holding parts need to be repeated a number of times, which increases the eccentricity adjustment process and further increases the manufacturing cost of the axial blower.

In the axial blower 100 according to the present embodiment, the eccentricity adjusting part 7 is provided on the outer circumference of the stator 2. Accordingly, the distance from the position where the stator 2 and the rotor 1 are provided to the position where the eccentricity adjusting part 7 does not increase even when the rotating blade assemblies are provided on both sides of the rotor 1. Thus, alignment of the position of the central axis AX of the inner side of the stator 2 with the central axis AX of the rotor 1 can be achieved with high accuracy. In addition, one eccentricity adjusting part 7 is sufficient, no large-scale mounting device is needed in the eccentricity adjustment process, such steps as measurement of the eccentricity of the rotating body are saved, and the increase in the manufacturing cost of the axial blower 100 is prevented.

<Operation of Axial Blower 100>

Operation of the axial blower 100 having the structure as described above will be described. Note that the "first radial magnetic bearing 13 and the second radial magnetic bearing 16" may simply be referred to as "radial magnetic bearings" below. The rotating body of the axial blower 100 is rotatably supported by a first bearing and a second bearing in a state in which the rotating body does not come in contact with the bearing holding parts and the casing 6. The axial blower 100 is installed so that the central axis AX of the rotating shaft 8 is horizontal. Thus, the rotating body on which the first rotating blade assembly 11 and the second rotating blade assembly 12 for circulating the laser medium gas are mounted is supported by the radial magnetic bearings provided at both ends of the rotating body in a non-contact manner in a direction in which the own weight is applied. The non-contact manner means a state in which the rotating body is not in contact with the casing 6. A radial magnetic bearing position detecting sensor unit provided near the radial magnetic bearings detects the position of a sensor target provided on the rotating shaft 8, and the fixed parts of the radial magnetic bearings operate so as to adjust the shaft to a predetermined position. The rotating body rotates by receiving the rotation driving force from the motor 3 of the axial blower 100. As the rotating blade assemblies mounted on the rotating body rotate, the laser medium gas is sucked into the axial blower 100 in the axial direction D2 of the rotating shaft 8. The sucked laser medium gas flows between the blades 11c of the first rotating blade assembly 11, is given velocity energy by the rotating blades 11c, and flows out at high velocities from the first rotating blade assembly 11.

Subsequently, the laser medium gas flows between the vanes 54 of the first stator vane assembly 5. The turbulent flow of the laser medium gas caused by swirling while passing through the first rotating blade assembly 11 is converted into a flow in the axial direction of the rotating shaft 8 by the first stator vane assembly 5, and thus the flow is straightened, and the straightened flow of the laser medium gas flows out from the first stator vane assembly 5. The straightened flow of the laser medium gas enters between the blades 12c of the second rotating blade assembly 12, is given velocity energy by the rotating blades 12c, and flows out at high velocities from the second rotating blade assembly 12. Thus, the laser medium gas discharged from the axial blower 100 is delivered at high velocities. Because a pressure difference is generated in the laser medium gas between the suction side and the discharge side of the axial blower 100, a pressing force acts on the rotating body in the axial direction D2 of the rotating shaft 8 toward the first bearing. The thrust magnetic bearing position detecting sensor, which is not illustrated, provided near the first thrust magnetic bearing 17 detects the rotational position of a target, which is not illustrated, provided on the rotating shaft 8, and the fixed part of the thrust magnetic bearing operates so as to adjust the rotating shaft 8 to a predetermined position.

<Advantageous Effects>

Because the bearings of the axial blower 100 are magnetic bearings, the rotating body is supported with no mechanical contact. Because abrasion is not caused by contact, the life cycle of the axial blower 100 becomes longer. In addition, the motor 3 can be rotated at high speeds, which improves the gas circulating function, that is, the gas cooling performance of the axial blower 100.

<Higher Rigidity Achieved By Eccentricity Adjusting Part 7 (Advantageous Effect 1)>

Next, an advantageous effect produced by the eccentricity adjusting part 7 will be explained. In order to rotate the axial blower 100 at high speeds, it is essential to prevent the bending natural frequency of the rotating body from lowering. To prevent the bending natural frequency of the rotating body from lowering, the weight of the rotating body needs to be reduced and the length of the rotating shaft 8 of the rotating body needs to be increased. The radial magnetic bearings generate magnetic attraction force that supports the rotating shaft 8. The magnetic attraction force, which supports the rotating shaft 8 at a preset position, is an attraction force that supports the rotating shaft 8 against the own weight of the rotating body and the attraction force generated by the motor 3. The attraction force generated by the motor 3 is a magnetic attraction force generated between the stator 2 and the rotor 1. As the eccentricity of the central axis AX of the stator 2 relative to the central axis AX of the rotor 1 becomes larger, the attraction force generated by the motor 3 becomes greater. Thus, in order to ensure a predetermined supporting force, that is, magnetic attraction force of the magnetic bearings, magnetic bearings having a great supporting force will be required, which increases the size of the radial magnetic bearings. The increase in the size of radial magnetic bearings results in an increase in the external dimension, such as the shaft length, of the rotating parts of the radial magnetic bearings, an increase in the weight of the rotating parts of the radial magnetic bearings, and a decrease in the bending natural frequency of the rotating body. Provision of the eccentricity adjusting part 7 enables the position of the central axis AX of the stator 2 to be aligned with the position of the central axis AX of the rotor 1 with high accuracy, which suppresses the generation of the magnetic attraction force due to an increase in the eccentricity described above. The supporting force of the magnetic bearings, which are bearings supporting the rotating body, is suppressed, and the magnetic bearings are reduced in size and weight. As a result of the reduction in size of the magnetic bearings, the length in the axial direction of the rotating body becomes smaller, the rigidity of the rotating body is improved, and furthermore, the rotating body is reduced in weight. As a result, the bending natural frequency of the rotating body is prevented from lowering, and the rotating body can rotate at high speeds, which improves the gas circulation performance. Furthermore, no large-scale mounting device is needed in the eccentricity adjustment process, and no such steps as measurement of the eccentricity of the rotating body are needed, the increase in the manufacturing cost of the axial blower 100 is suppressed.

<Higher Rigidity Achieved by Provision of Rotating Blade Assemblies on Both Sides of Rotor 1 (Advantageous Effect 2)>

Next, an advantageous effect produced by providing the first rotating blade assembly 11 and the second rotating blade assembly 12 on both sides of the rotor 1 will be explained. In the axial blower 100, the rotating part 13a of the first radial magnetic bearing 13 is provided at an end of the rotating shaft 8, and the first radial magnetic bearing 13, the first rotating blade assembly 11, the rotor 1, the second rotating blade assembly 12, and the second radial magnetic bearing 16 are arranged in this order along the axial direction D2 of the rotating shaft 8. Thus, the rotor 1 is located at the center of the rotating shaft 8, and the rotating blade assemblies are located on both sides of the rotor 1, and the rotating parts of the radial magnetic bearings are located on both sides of the rotating blade assemblies. In order to efficiently circulate a flow of the laser medium gas by the axial blower 100, the vanes 54 of the first stator vane assembly 5 are set in a predetermined shape in advance, the blades of the rotating blade assemblies are set in a predetermined shape in advance, and the vanes 54 of the first stator vane assembly 5 and the blades of the rotating blade assemblies are set at predetermined positions. In particular, the intervals between the vanes 54 of the first stator vane assembly 5 and the blades of the rotating blade assemblies are preferably set to be small. The stator vane assembly forms velocity distribution that guides the flow of the laser medium gas without causing a pressure loss between the rotating blade assemblies. The pressure loss is equal to energy loss. Thus, as the intervals between the vanes 54 of the first stator vane assembly 5 and the blades of the rotating blade assemblies are larger, the velocity distribution of the flow of the laser medium gas varies, which increases the pressure loss and thus lowers the flow rate of the laser medium gas. Assume a case where the rotor 1 is located at the center of the rotating shaft 8, and the rotor 1, a rotating blade assembly, and the rotating parts of a thrust bearing and a radial magnetic bearing are arranged in this order from the rotor 1 toward an end of the rotating shaft 8. In this case, the shaft length of the cylindrical part of the rotating blade assembly becomes longer than that in a case where the rotor 1, a rotating blade assembly, the rotating parts of a thrust bearing and a radial magnetic bearing are arranged in the following order: the rotor 1, the rotating blade assembly, the radial magnetic bearing, and the thrust bearing. The reason for which the shaft length of the cylindrical part of the rotating blade assembly becomes longer is that, the fixed part of the radial magnetic bearing is fixed to the cylindrical part of the rotating blade assembly in a state in which the thrust bearing is present between the rotating blade assembly and the rotating part of the radial magnetic bearing. As the shaft length of the cylindrical part of the rotating blade assembly becomes longer, however, the blades of the rotating blade assembly are likely to spread in the radial direction D3 by centrifugal force during high-speed rotation. Thus, the casing 6 and the blades of the rotating blade assembly are likely to come in contact with each other. The spread of the blades of the rotating blade assembly due to the centrifugal force is suppressed and the contact between the casing 6 and the blades of the rotating blade assembly is prevented by increasing the thickness of a joint between the back plate part of the rotating blade assembly and the cylindrical part of the rotating blade assembly, that is, reinforcement of the joint. As the thickness of the joint between the back plate part of the rotating blade assembly and the cylindrical part of the rotating blade assembly increases, however, the rotating blade assembly increases in weight. As the weight of the rotating body increases with the increase in weight of the rotating blade assembly mounted on the rotating shaft 8, the bending natural frequency of the rotating body lowers, which prevents the rotation speed of the rotating body from increasing. In contrast, in the axial blower 100 according to the first embodiment, the rotor 1, the rotating blade assembly, the radial magnetic bearing, and the thrust bearing are arranged in this order from the center of the rotating shaft 8 in the axial direction D2 toward and end of the rotating shaft 8. Thus, the thrust bearing is not present between the rotating blade assembly and the radial magnetic bearing. As a result, the position of the radial magnetic bearing is closer to the rotating blade assembly, the shaft length of the cylindrical part of the rotating blade assembly becomes shorter, and the rotating blade assembly is reduced in weight. This reduces the weight of the rotating body, prevents the bending natural frequency of the rotating body from lowering, and enables the rotating body to rotate at high speeds.

An example of specific analysis results of the operation of the axial blower 100 will be presented here. In this example, it is assumed that the motor 3 has an output of about 7 kW, the flange 53 has four through-holes 53a having a diameter of 5.8 mm that are uniformly arranged, and four holes 51a are formed uniformly at ends of the stator holding part 51 in the axial direction. In addition, it is assumed that a metric thread having an outer diameter of 5.0 mm is used as the fastening member 56, the adjustment margin between the through-hole 53a and the metric thread is 0.4 mm, and the flange 53 is fixed to the stator holding part 51. As a result of natural vibration analysis using the finite element method, when the number of revolutions of the rotating body is 333 Hz, that is, 20,000 rpm, the primary bending natural frequency of the rotating body is about 1,200 Hz. The primary bending natural frequency is approximately three times the number of revolutions and a sufficient frequency margin is thus present, which shows that the rotating body can perform the rotating operation.

Second Embodiment.

Figure 6:
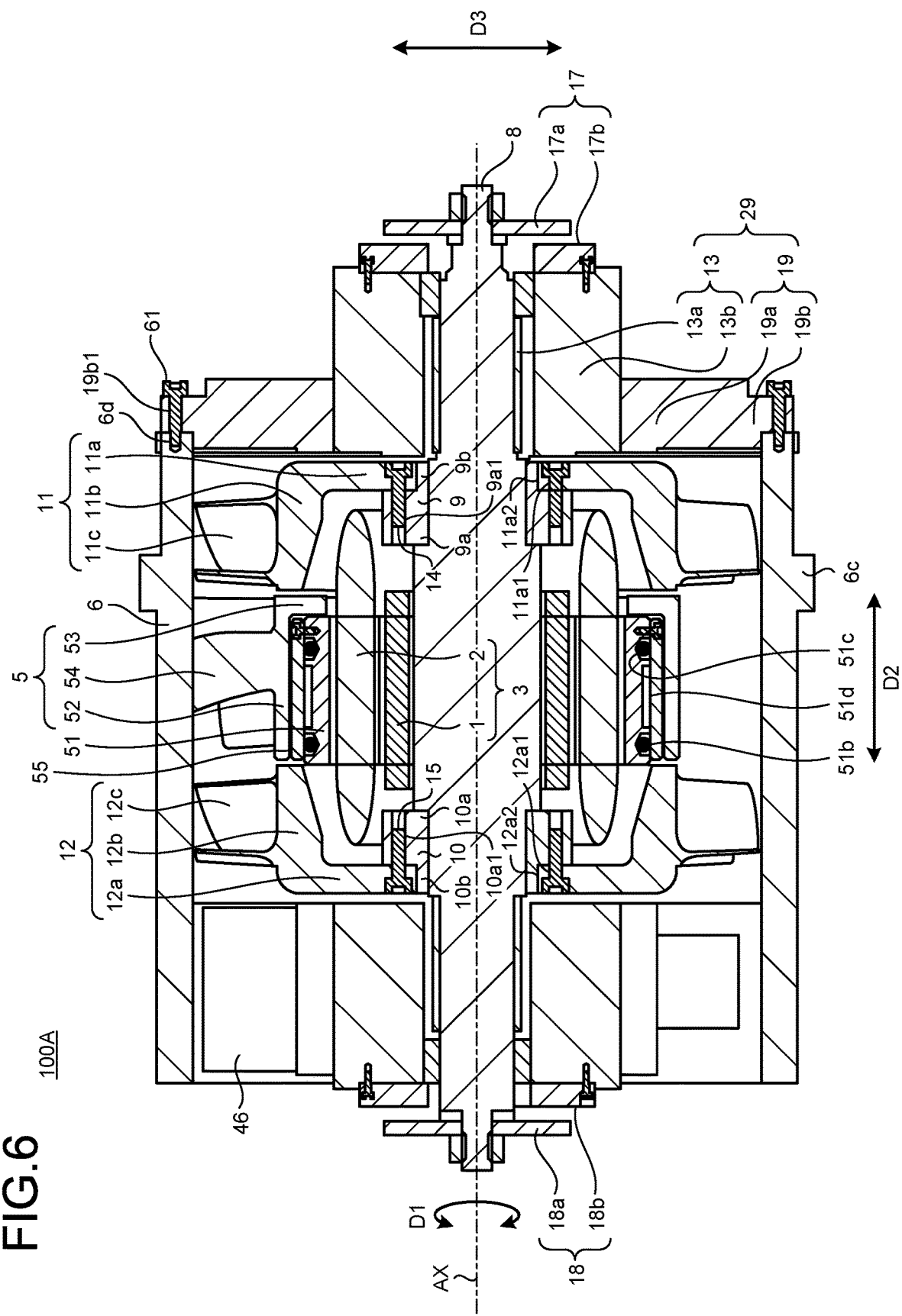
FIG. 6 is a cross-sectional view of an axial blower according to a second embodiment.

FIG. 6 is a cross-sectional view of an axial blower according to a second embodiment. In an axial blower 100A according to the second embodiment, the second bearing holding part 20 on the discharge side in the first embodiment is replaced with a second stator vane assembly 46. The second stator vane assembly 46 is located on the inner side of the casing 6, and a second bearing is fixed to the second stator vane assembly 46. The casing 6 is a cover member that accommodates the motor 3, the first stator vane assembly 5, the second stator vane assembly 46, the first rotating blade assembly 11, and the second rotating blade assembly 12. The axial blower 100A according to the second embodiment produces the effects similar to those in the first embodiment. In addition, with the axial blower 100A according to the second embodiment, due to the second stator vane assembly 46, the flow of the laser medium gas discharged from the second rotating blade assembly 12 is straightened into a flow in the axial direction, which results in an efficient axial blower 100A. This further increases the gas circulation performance of the axial blower 100A.

Third Embodiment

Figure 7:
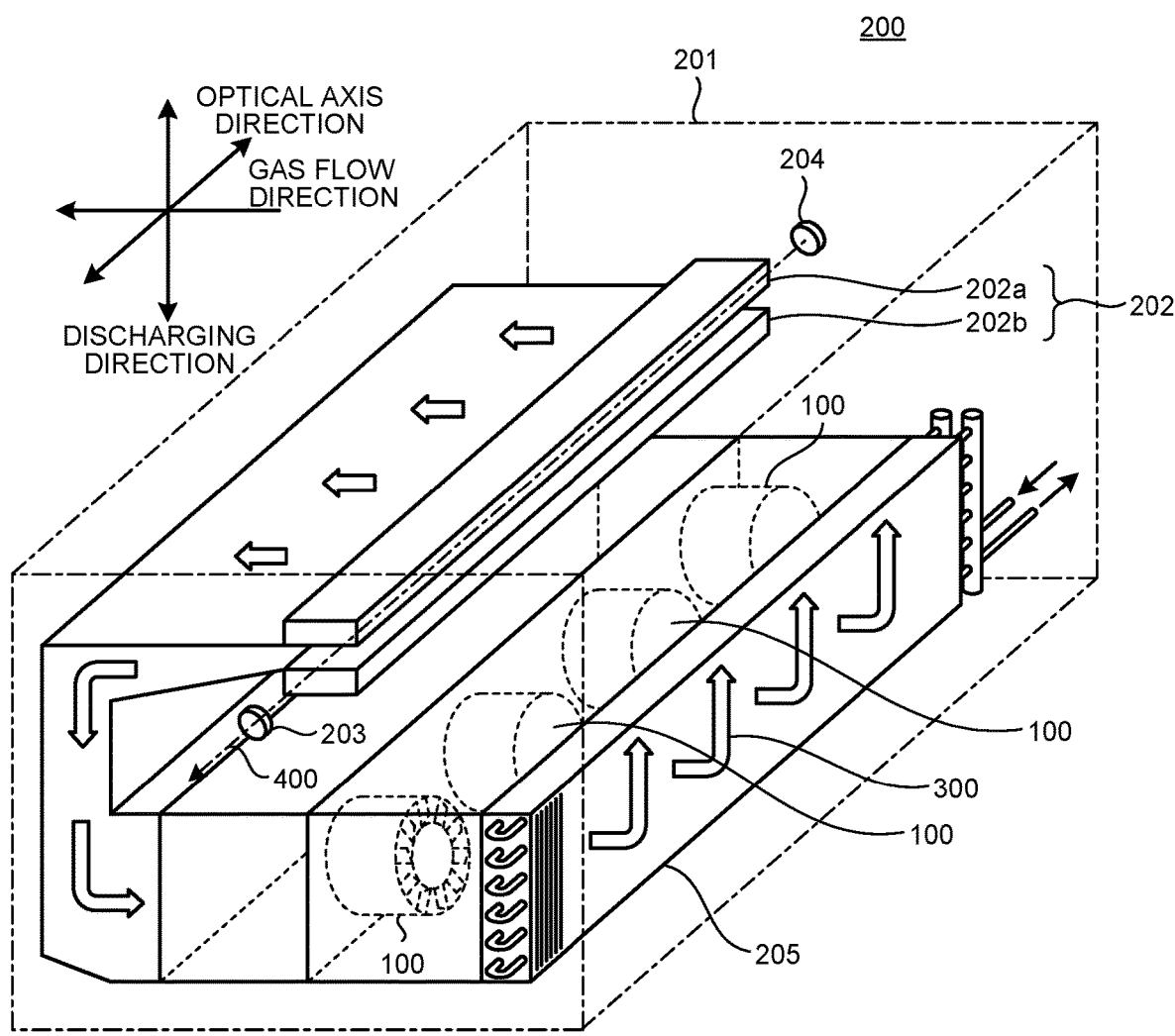
FIG. 7 is a perspective view of a laser oscillator according to a third embodiment.
Figure 8:
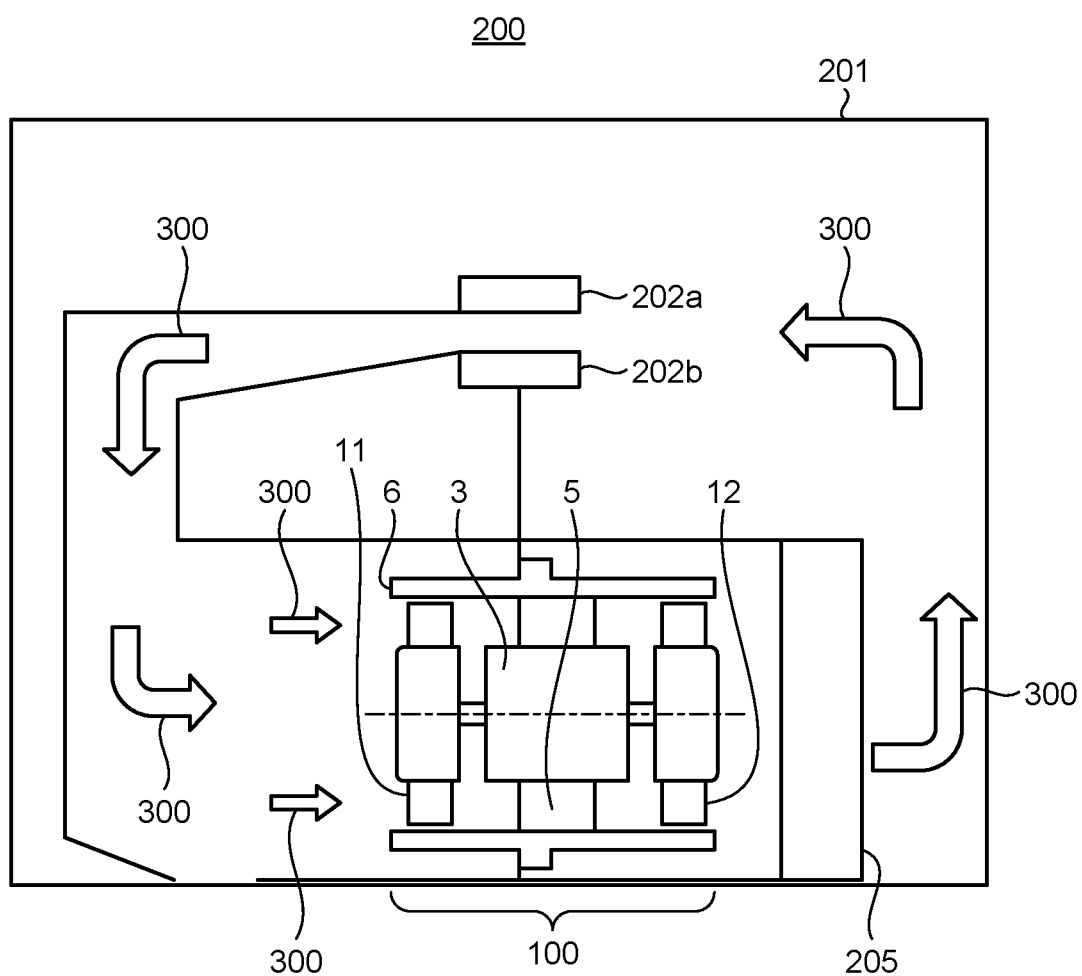
FIG. 8 is a cross-sectional view of the laser oscillator according to the third embodiment.

FIG. 7 is a perspective view of a laser oscillator according to a third embodiment. FIG. 8 is a cross-sectional view of the laser oscillator according to the third embodiment. A laser oscillator 200 includes a housing 201 that is a vacuum vessel in which laser medium gas 300 is encapsulated, a discharging unit 202 used for discharge pumping of the laser medium gas 300, a partially-reflecting mirror 203, a totally-reflecting mirror 204, a heat exchanger 205 that cools the laser medium gas 300, and an axial blower 100 that circulates the laser medium gas 300. The discharging unit 202 includes a pair of discharge electrodes 202a and 202b. The totally-reflecting mirror 204 and the partially-reflecting mirror 203 are correspondingly provided on the sides of the housing 201 in the optical axis direction, and constitute an optical resonator. Laser 400 is emitted from the partially-reflecting mirror 203. In a case where windows are mounted instead of the totally-reflecting mirror 204 and the partially-reflecting mirror 203, the laser oscillator 200 functions as a laser amplifier. Herein, the laser medium gas 300 passes through the heat exchanger 205 before entering the discharging unit 202, and is circulated in the housing 201 by four axial blowers 100.

Operation of the laser oscillator 200 will be described. The rotating shafts 8 on which a rotating blade assembly is mounted rotate at high speeds of several tens of thousands rpm by receiving the rotation driving force from the motors 3 included in the axial blowers 100. In the axial blowers 100, the laser medium gas 300 flows around the motors 3 and straight in axial direction D2. The axial direction D2 is equal to the gas flow direction illustrated in FIG. 7. The motors 3 rotate at high speeds to increase the air volume, which increases the circulation cooling performance of the laser medium gas 300, and the laser oscillator 200 are decreased in size and increased in output. Note that the axial blowers 100A according to the second embodiment may be used in the laser oscillator 200, which produces the effects similar to those in the case where the axial blowers 100 are used.

The configurations presented in the embodiments above are examples of the present invention, and can be combined with other known technologies or can be partly omitted or modified without departing from the scope of the present invention.

REFERENCE SIGNS LIST 1 rotor; 2 stator; 3 motor; 5 first stator vane assembly; 6 casing; 6a, 6b, 9a1, 11a1, 12a1, 19c, 53a through-hole; 6c base; 6d, 19b1 screw hole; 7 eccentricity adjusting part; 8 rotating shaft; 9 first rotating blade assembly holding part; 9a, 10a first annular portion; 9b, 10b second annular portion; 10 second rotating blade assembly holding part; 10a1 screw through-hole; 11 first rotating blade assembly; 11a, 12a back plate part; 11a2, 12a2 rotating blade holding hole; 11b, 12b, 19a, 20a cylindrical part; 11c, 12c, 54 blade; 12 second rotating blade assembly; 13 first radial magnetic bearing; 13a, 16a, 17a, 18a rotating part; 13b, 16b, 17b, 18b fixed part; 14, 15 rotating blade attaching screw; 16 second radial magnetic bearing; 17 first thrust magnetic bearing; 18 second thrust magnetic bearing; 19 first bearing holding part; 19b, 20b, 44b support beam part; 19b2 pin hole; 20 second bearing holding part; 29 first radial magnetic bearing part; 30 second radial magnetic bearing part; 39 jig shaft; 39a inclined portion; 39b stator axial center adjustment external thread; 40 stator axial center adjustment ball; 41 stator axial center adjustment ball holding part; 41a stator axial center adjustment ball holding groove; 41b stator axial center adjustment internal thread; 42 stator axial center adjustment member; 42a resin band; 43 jig cover; 43a stator axial center adjustment member groove; 44 rotation stopping member; 44a stopper member; 45 centering adjustment jig; 46 second stator vane assembly; 47 pin; 51 stator holding part; 51a hole; 51b O-ring; 51c annular groove; 51d groove; 52 vane base part; 53 flange; 53b clearance; 55 cover; 56 fastening member; 60, screw; 71 inlet pipe; 72 outlet pipe; 73 power line; 100, 100A axial blower; 200 laser oscillator; 201 housing; 202 discharging unit; 202a, 202b discharge electrode; 203 partially-reflecting mirror; 204 totally-reflecting mirror; 205 heat exchanger; 300 laser medium gas; 400 laser; AX central axis; D1 circumferential direction; D2 axial direction; D3 radial direction.

The invention claimed is:

1. A rotation driving device comprising;
a rotating shaft;
a rotor provided on an outer circumference of the rotating shaft;
a stator provided on an outer circumference of the rotor;
a casing accommodating the stator;
a pair of bearings correspondingly provided at both ends of the rotating shaft and supporting the rotating shaft;
a pair of bearing holding parts correspondingly provided at both ends of the casing and holding the bearings;
a stator holding part provided on an outer circumference of the stator;
a cylindrical member provided on an outer circumference of the stator holding part;
a flange extending from an end of the cylindrical member in an axial direction toward the rotating shaft, and facing an end of the stator holding part in the axial direction; and
a fastening member fastened to the end of the stator holding part in the axial direction via the flange, wherein
the flange has a through-hole extending through the flange in the axial direction and in which the fastening member is inserted,
the through-hole has a diameter smaller than that of a head of the fastening member and larger than that of a screw part of the fastening member,
the rotating shaft, the rotor, the stator, the stator holding part, and the cylindrical member are arranged in this order in a radial direction in the casing, and
the rotating shaft, the rotor, the stator, the stator holding part, and the cylindrical member are concentrically arranged.

2. The rotation driving device according to claim 1, wherein
the bearings are magnetic bearings supporting the rotating shaft with respect to the bearing holding parts in a non-contact manner.

3. A method for mounting the rotation driving device according to claim 1, the method comprising:
adjusting a position of a central axis of the stator in the radial direction relative to a central axis of the rotor in a state in which an end of the flange in the axial direction is in contact with the end of the stator holding part in the axial direction; and
fixing the flange to the stator holding part by screwing the fastening member into the end of the stator holding part after the position adjusting.

4. An axial blower comprising:
a rotating shaft provided with a first rotating blade assembly and a second rotating blade assembly to circulate gas;
a rotor provided on an outer circumference of the rotating shaft;
a stator provided on an outer circumference of the rotor;
a casing accommodating the stator, the first rotating blade assembly, the second rotating blade assembly, and a first stator vane assembly;
a pair of bearings correspondingly provided on both ends of the rotating shaft and supporting the rotating shaft;
a pair of bearing holding parts correspondingly provided on both ends of the casing and holding the bearings;
a stator holding part provided on an outer circumference of the stator;
a cylindrical member provided on an outer circumference of the stator holding part, and provided with the first stator vane assembly on an outer circumference thereof;
a flange extending from an end of the cylindrical member in an axial direction toward the rotating shaft, and facing an end of the stator holding part in the axial direction; and
a fastening member fastened to the end of the stator holding part n the axial direction via the flange, wherein
the first stator vane assembly is fixed to an inner side of the casing,
the flange has a through-hole extending through the flange in the axial direction and in which the fastening member is inserted,
the through-hole has a diameter smaller than that of a head of the fastening member and larger than that of a screw part of the fastening member,
the rotating shaft, the rotor, the stator, the stator holding part, the cylindrical member, and the first stator vane assembly are arranged in this order in a radial direction in the casing, and
the rotating shaft, the rotor, the stator, the stator holding part, the cylindrical member, and the first stator vane assembly are concentrically arranged.

5. The axial blower according to claim 4, wherein
the bearings are magnetic bearings supporting the rotating shaft with respect to the bearing holding parts in a non-contact manner.

6. The axial blower according to claim 4, wherein the rotating shaft is provided with the pair of bearings comprising a radial bearing and a thrust bearing, and the rotor, the first rotating blade assembly, the radial bearing, and the thrust bearing are arranged in this order from a center of the rotating shaft in the axial direction toward an end of the rotating shaft.

7. The axial blower according to claim 6, wherein
a second stator vane assembly is accommodated in the casing in addition to the stator, the first rotating blade assembly, the second rotating blade assembly, and the first stator vane assembly,
the second stator vane assembly is fixed to the inner side of the casing, and
the radial bearing is held by the second stator vane assembly.

8. A laser oscillator comprising:
a housing in which laser medium gas is encapsulated;
a discharger to pump the laser medium gas by electric discharge;
the axial blower according to claim 4 to circulate the laser medium gas pumped by the discharger; and
a heat exchanger to cool the laser medium gas.

9. A method for mounting the axial blower according to claim 4, the method comprising:
adjusting a position of a central axis of the stator in the radial direction relative to a central axis of the rotor in a state in which an end of the flange in the axial direction is in contact with the end of the stator holding part in the axial direction; and
fixing the flange to the stator holding part by screwing the fastening member into the end of the stator holding part after the adjusting.

10. The axial blower according to claim 5, wherein the rotating shaft is provided with the pair of bearings comprising a radial bearing and a thrust bearing, and the rotor, the first rotating blade assembly, the radial bearing, and the thrust bearing are arranged in this order from a center of the rotating shaft in the axial direction toward an end of the rotating shaft.

11. The axial blower according to claim 10, wherein
a second stator vane assembly is accommodated in the casing in addition to the stator, the first rotating blade assembly, the second rotating blade assembly, and the first stator vane assembly,
the second stator vane assembly is fixed to the inner side of the casing, and
the radial bearing is held by the second stator vane assembly.

* * * * *